US008462721B2

(12) United States Patent
Bienas et al.

(10) Patent No.: US 8,462,721 B2
(45) Date of Patent: Jun. 11, 2013

(54) RADIO BASE STATIONS, MOBILE RADIO TERMINALS, METHODS FOR CONTROLLING A RADIO BASE STATION, AND METHODS FOR CONTROLLING A MOBILE RADIO TERMINAL

(75) Inventors: Maik Bienas, Braunschweig (DE); Hyung-Nam Choi, Hamburg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 306 days.

(21) Appl. No.: 12/896,951

(22) Filed: Oct. 4, 2010

(65) Prior Publication Data

US 2012/0082099 A1    Apr. 5, 2012

(51) Int. Cl.
*H04W 4/00* (2009.01)
(52) U.S. Cl.
USPC .......................................... 370/329; 370/328
(58) Field of Classification Search
USPC ................................................. 370/328, 329
See application file for complete search history.

(56) References Cited

U.S. PATENT DOCUMENTS

| 2004/0127244 | A1* | 7/2004 | Matsumoto et al. | 455/517 |
| 2008/0207196 | A1* | 8/2008 | Pettersson | 455/424 |
| 2009/0175253 | A1* | 7/2009 | Wu et al. | 370/338 |
| 2010/0184454 | A1* | 7/2010 | Luft et al. | 455/456.5 |
| 2010/0248638 | A1* | 9/2010 | Harada et al. | 455/67.11 |
| 2012/0163326 | A1* | 6/2012 | Lee et al. | 370/329 |

FOREIGN PATENT DOCUMENTS

| WO | 2008052383 A1 | 5/2008 |
| WO | 2009096833 A1 | 8/2009 |

OTHER PUBLICATIONS

3GPP TSG-RAN #45, RP-090991 "New SI proposal: RAN Improvements for Machine-type Communications", Sep. 15-18, 2009, Sevilla, Spain, pp. 1-5.
3GPP TS 22.368, V10.2.0 "3rd Generation Partnership Project; Technical Specification Group Services and System Aspects; Service requirements for Machine-Type Communications (MTC); Stage 1 (Release 10)", Sep. 2009; pp. 1-22.
3GPP TS 36.211, V8.9.0 3rd Generation Parnership Project; Technical Specification Group Radio Access Network; Evolved Universal Terrestrial Radio Access (E-UTRA); Physical Channels and Modulation (Release 8), Dec. 2009, pp. 1-83.
3GPP TS 36.300, V10.1.0 3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 10), Sep. 2010, pp. 1-192.
3GPP TS 36.321, V9.3.0 3rd Generation Partnership Project; Technical Specification Group Radio Access Network; Evolved Universal Terrestrial Radio Access (E-UTRA); Medium Access Control (MAC) protocol specification (Release 9); Jun. 2010, pp. 1-48.

* cited by examiner

*Primary Examiner* — Kenny Lin

(57) ABSTRACT

In an embodiment, a radio base station is provided. The radio base station may include: a receiver configured to receive, via a pre-determined radio resource, a Random Access Preamble from a mobile radio terminal; a load determiner configured to determine whether a load situation which fulfills a pre-determined criterion is present for at least one communication resource of the radio base station; a Random Access Response message generator configured to generate, based on the determination of the load determiner, a Random Access Response message including controlling information for controlling access to the pre-determined radio resource and recipient information indicating whether a recipient of the Random Access Response message is to apply the controlling information; and a sender configured to send the Random Access Response message in response to the received Random Access Preamble to the mobile radio terminal.

25 Claims, 6 Drawing Sheets

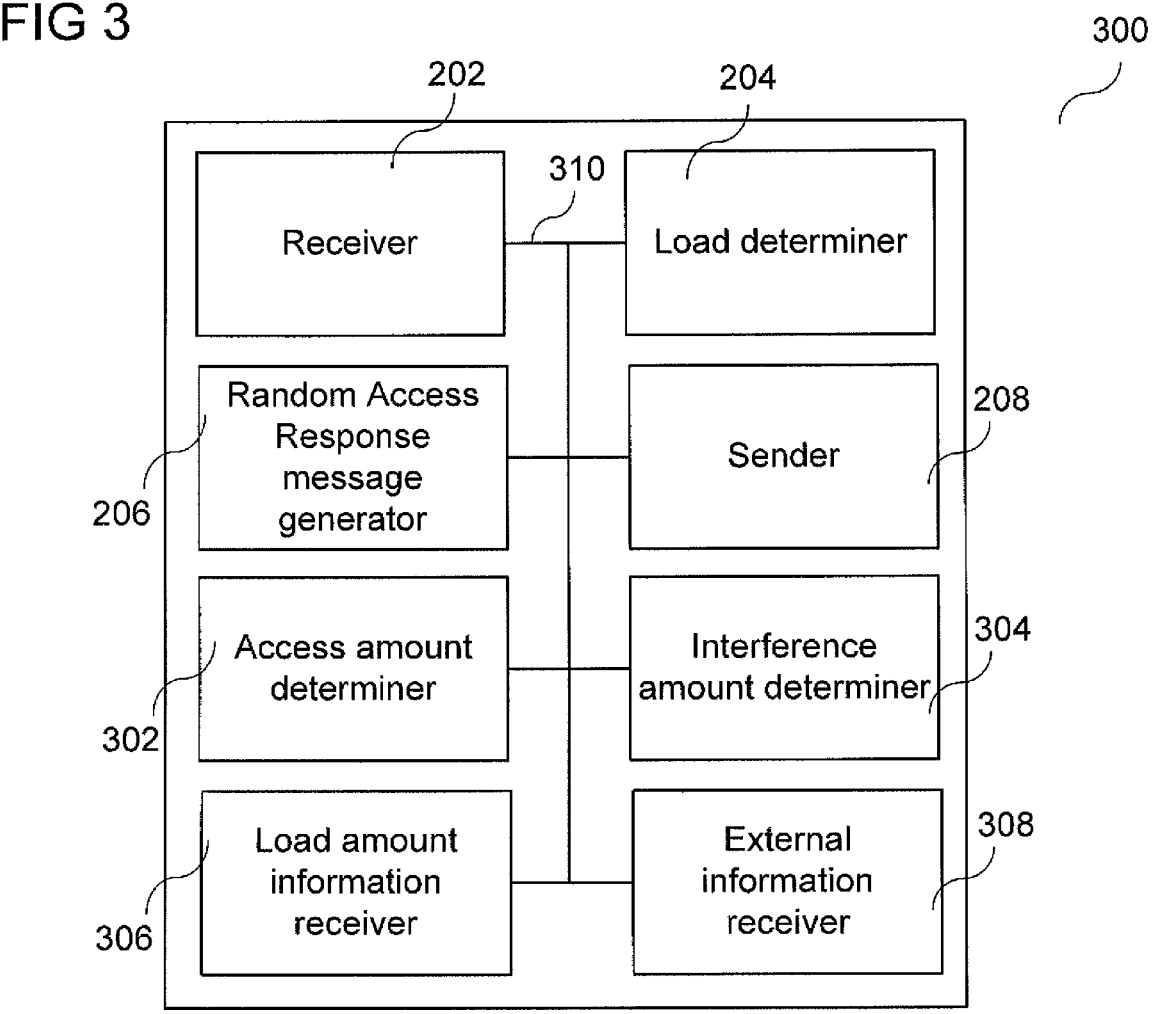

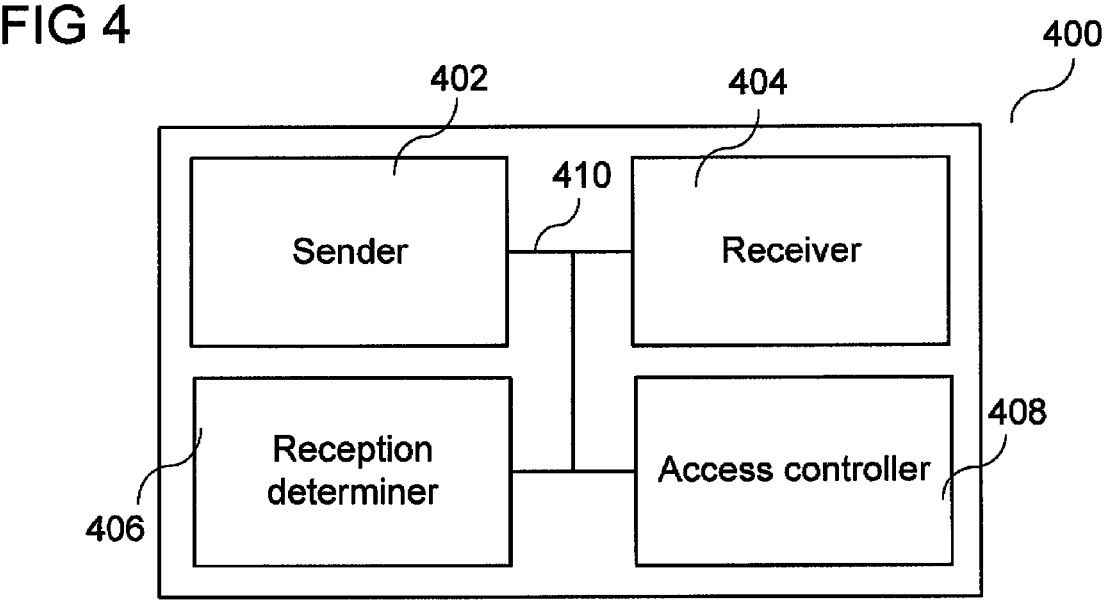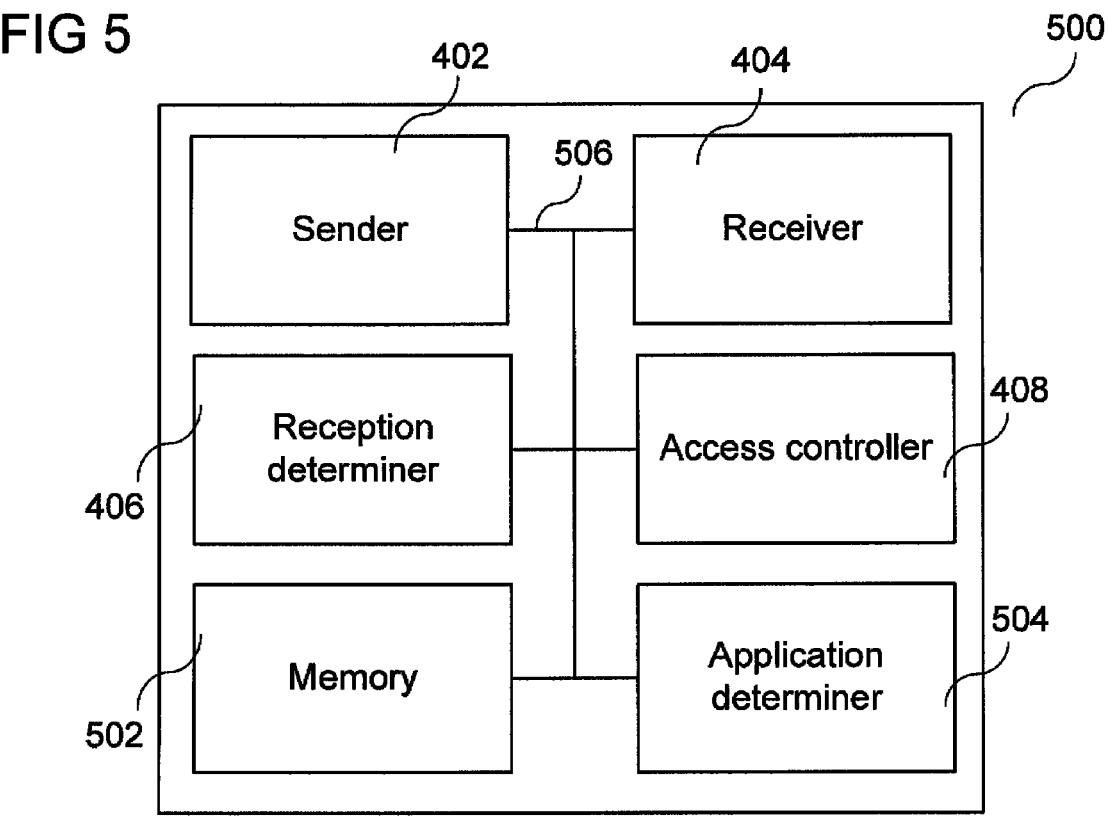

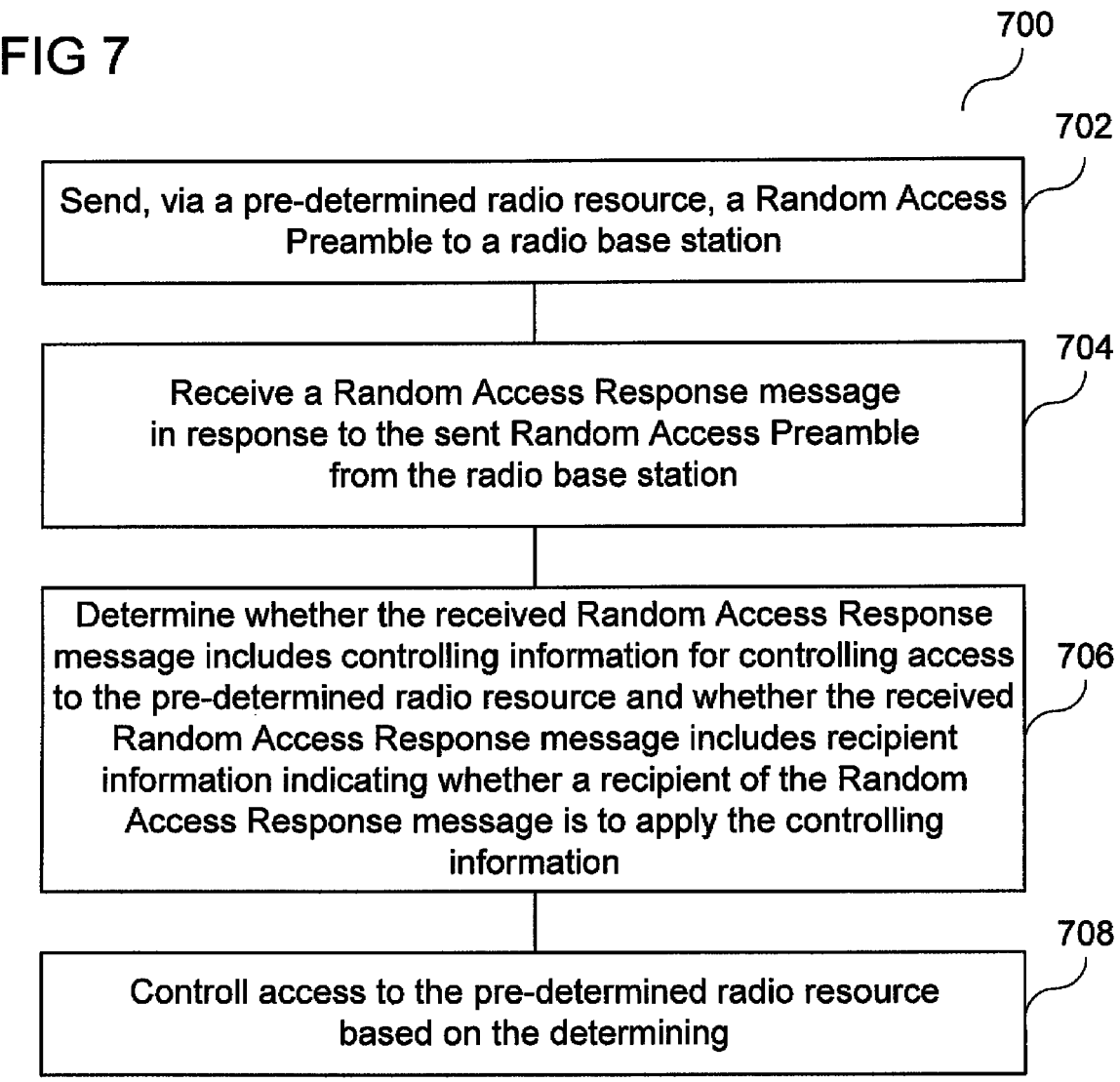
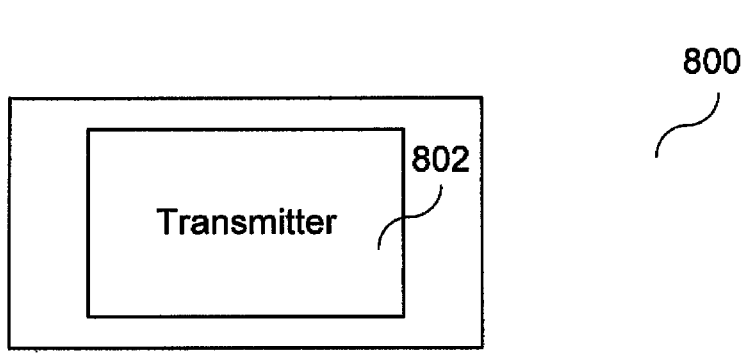

RADIO BASE STATIONS, MOBILE RADIO TERMINALS, METHODS FOR CONTROLLING A RADIO BASE STATION, AND METHODS FOR CONTROLLING A MOBILE RADIO TERMINAL

TECHNICAL FIELD

Embodiments relate generally to radio base stations, mobile radio terminals, methods for controlling a radio base station and methods for controlling a mobile radio terminal.

BACKGROUND

Machine-type communications (MTC) is a topic that gained strong interest in the recent years as market growth is expected in the future. MTC refers to data communications between machines over mobile networks that do not necessarily need human interaction. Examples of MTC applications include fleet management, remote maintenance and control, e.g. smart meters, and remote diagnostics. On the number of MTC Devices that needs to be served, e.g. as smart meters, about 1000 per sector are assumed. An issue may be seen in certain cases, if such devices will access the network simultaneously. This may for example occur after power disruption. For example, an overload of the random access may be seen as critical.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3 shows a radio base station in accordance with an embodiment;

FIG. 4 shows a mobile radio terminal in accordance with an embodiment;

FIG. 5 shows a mobile radio terminal in accordance with an embodiment;

FIG. 7 shows a flow diagram illustrating a method for controlling a mobile radio terminal in accordance with an embodiment;

FIG. 8 shows a radio base station in accordance with an embodiment;

DESCRIPTION

Figure 1:
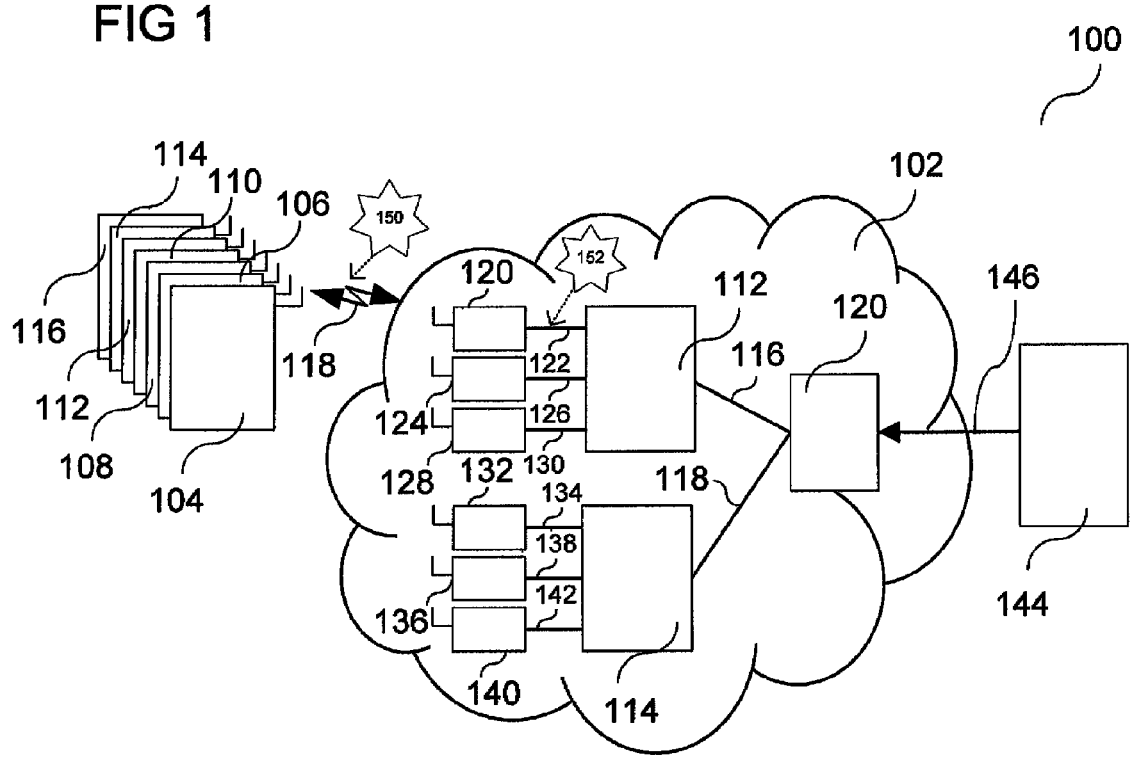
FIG. 1 shows a network architecture in accordance with an embodiment.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any embodiment or design described herein as "exemplary" is not necessarily to be construed as preferred or advantageous over other embodiments or designs.

A mobile radio terminal according to various embodiments may be a device configured for wired communication, for example a desktop computer or a laptop, or for wireless communication, for example a radio communication device. In various embodiments, a radio communication device may be an end-user mobile device (MD). In various embodiments, a radio communication device may be any kind of mobile radio communication device, mobile telephone, personal digital assistant, mobile computer, or any other mobile device configured for communication with a mobile communication base station (BS) or an access point (AP) and may be also referred to as a User Equipment (UE), a mobile station (MS) or an advanced mobile station (advanced MS, AMS), for example in accordance with IEEE 802.16m.

A mobile radio terminal may include a memory which may for example be used in the processing carried out by the mobile radio terminal A radio base station may include a memory which is for example used in the processing carried out by the radio base station. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Various embodiments are provided for devices, and various embodiments are provided for methods. It will be understood that basic properties of the devices also hold for the methods and vice versa. Therefore, for sake of brevity, duplicate description of such properties may be omitted.

Machine-type communications (MTC) is a topic that gained strong interest in the recent years as market growth is expected in the future. MTC may refer to data communications between machines over mobile networks that do not necessarily need human interaction. Examples of MTC applications may include fleet management, remote maintenance and control, e.g. smart meters, and remote diagnostics.

In case many devices wants to use a random access channel (RACH), access attempts may fail (which may correspond to a RACH overload). This may occur e.g. after power disruptions if about 1000 smart meters in the related cell want to report the failure to an MTC server.

FIG. 1 shows a network architecture 100 in accordance with an embodiment. The network architecture 100 may be a high-level network architecture to support MTC. A plurality of MTC devices may be provided (for example a first MTC device 104, a second MTC device 106, a third MTC device 108, a fourth MTC device 110, a fifth MTC device 112, a sixth MTC device 114, and a seventh MTC device 116). An MTC device may be a UE equipped for machine-type communications, which may communicate through a public land mobile network (PLMN) 102 (like indicated by arrow 118), which may for example be provided in the operator domain, with at least one MTC server 144 or other MTC devices.

The MTC server 144 may be a device, which may communicate to the PLMN 102 itself (like indicated by arrow 146), and to MTC devices through the PLMN 102. The MTC server 144 may perform services for the MTC user. The MTC server 144 may be located inside or outside the PLMN 102, depending on the level of flexibility to be introduced.

The MTC user may use the services provided by the MTC server 144.

According to various embodiments, improvement for the radio access network (RAN) for MTC may be provided. According to various embodiments, efficient use of RAN resources (UTRA (UMTS (Universal Mobile Telecommunications System) Terrestrial Radio Access)/E-UTRA (evolved UTRA)) may be provided for machine-type communications considering their specific requirements, the system performance impact introduced by serving a possibly very large number of MTC Devices, and reducing the complexity of MTC. On the number of MTC devices that needs to be served, e.g. as smart meters, about 1000 per sector may be assumed. An issue may be seen in certain cases, if such devices will access the network simultaneously. This may for example occur after power disruption. For example, an overload of the random access may be seen as critical. Methods to avoid such RACH access overload from MTC Devices without significant impact on non-MTC devices are currently discussed in 3GPP (Third Generation Partnership Project).

In the PLMN 102, a packet data network gateway (PGW) 120 may be provided, and the MTC server 144 may communicate with the PGW 120, like indicated by arrow 146. A first mobility management entity (MME)/service gateway (SGW) 112 may be connected to the PGW 120 like indicated by line 116. A second mobility management entity (MME)/service gateway (SGW) 114 may be connected to the PGW 120 like indicated by line 118.

A first base station 120 (for example a first eNodeB (eNB, which may be a base transceiver station in LTE (long term evolution))) may be connected to the first MME/SGW 112, like indicated by line 122. A second base station 124 (for example a second eNodeB (eNB)) may be connected to the first MME/SGW 112, like indicated by line 126. A third base station 128 (for example a third eNodeB (eNB)) may be connected to the first MME/SGW 112, like indicated by line 130.

Furthermore, a fourth base station 132 (for example a fourth eNodeB (eNB)) may be connected to the second MME/SGW 114, like indicated by line 134. A fifth base station 136 (for example a fifth eNodeB (eNB)) may be connected to the second MME/SGW 114, like indicated by line 138. A sixth base station 140 (for example a fourth eNodeB (eNB)) may be connected to the second MME/SGW 114, like indicated by line 142.

The interfaces that may be affected by the overload are depicted in FIG. 1 and are marked with stars. These interfaces may be for example the air interface 118 (marked with star 150), for example a RACH (radio access channel) on the air interface, and the connection eNB-MME (in other words: the connection between a base station, for example the first base station 120, and an MME, for example the first MME 112), marked with star 152, in the core network of the operator.

According to various embodiments, devices and methods may be provided for optimizing the random access procedure, for example the random access procedure like specified in LTE (Long Term Evolution), due to the presence of MTC-Devices, for example when a large number of MTC devices may try to access the mobile network simultaneously which may cause an overload of the random access channel.

Figure 2:
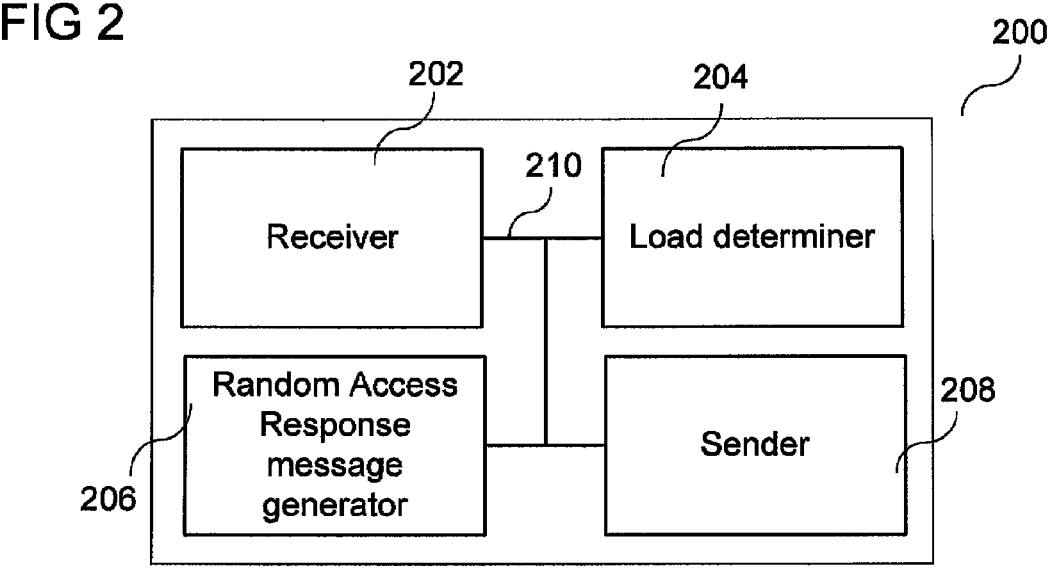
FIG. 2 shows a radio base station in accordance with an embodiment.

FIG. 2 shows a radio base station 200 in accordance with an embodiment. The radio base station 200 may include a receiver 202 configured to receive, via a pre-determined radio resource, a Random Access Preamble from a mobile radio terminal (not shown in FIG. 2); a load determiner 204 configured to determine whether a load situation which fulfills a pre-determined criterion is present for at least one communication resource of the base station 200; a Random Access Response message generator 206 configured to generate, based on the determination of the load determiner 204, a Random Access Response message including controlling information for controlling access to the pre-determined radio resource and recipient information indicating whether a recipient of the Random Access Response message is to apply the controlling information; and a sender 208 (in other words: a transmitter) configured to send (in other words: to transmit) the Random Access Response message in response to the received Random Access Preamble to the mobile radio terminal. The receiver 202, the load determiner 204, the Random Access Response message generator 206, and the sender 208 may be coupled with each other, e.g. via an electrical connection 210 such as e.g. a cable or a computer bus or via any other suitable electrical connection to exchange electrical signals.

According to various embodiments, a recipient of a message may be understood as a mobile radio terminal that may receive and decode the message.

According to various embodiments, the recipient information may indicate whether a recipient that is able to decode the Random Access Response message is to apply the controlling information.

In various embodiments, at least one of the receiver 202 and the sender 208 may be configured according to at least one radio communication technology of one of the following radio communication technology families:

a Short Range radio communication technology family;

a Metropolitan Area System radio communication technology family;

a Cellular Wide Area radio communication technology family;

a radio communication technology family which includes a radio communication technology in which the access to radio resources is provided in a random manner; and a radio communication technology family which includes a radio communication technology in which the access to radio resources is provided in a centrally controlled manner.

In various embodiments, at least one of the receiver 202 and the sender 208 may be configured according to at least one of the following radio communication technologies: a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, and Unlicensed Mobile Access (UMA, also referred to as also referred to as 3GPP Generic Access Network, or GAN standard)).

According to various embodiments, the pre-determined radio resource may include or may be a random access channel.

According to various embodiments, the pre-determined radio resource may include or may be an LTE RACH.

According to various embodiments, the pre-determined radio resource may include or may be a physical random access channel.

According to various embodiments, the pre-determined radio resource may include or may be an LTE PRACH.

According to various embodiments, the mobile radio terminal may include or may be at least one of a user equipment and a machine-type communications device.

According to various embodiments, the mobile radio terminal may include or may be a smart meter.

According to various embodiments, the at least one communication resource of the base station 200 may include or may be the pre-determined radio resource.

According to various embodiments, the pre-determined criterion may include or may be a criterion related to an overload on the pre-determined radio resource.

FIG. 3 shows a radio base station 300 in accordance with an embodiment. The radio base station 300 may include, similar to the base station 200 shown in FIG. 2, a receiver 202, a load determiner 204, a Random Access Response message generator 206, and a sender 208. The radio base station 300 may further include an access amount determiner 302, like will be explained in more detail below, an interference amount determiner 304, like will be explained in more detail below, a load amount information receiver 306, like will be explained in more detail below, and an external information receiver 308, like will be explained in more detail below. The receiver 202, the load determiner 204, the Random Access Response message generator 206, the sender 208, the access amount determiner 302, the interference amount determiner 304, the load amount information receiver 306, and the external information receiver 308 may be coupled with each other, e.g. via an electrical connection 310 such as e.g. a cable or a computer bus or via any other suitable electrical connection to exchange electrical signals.

Various parts of the radio base station 300 may be similar to parts of the radio base station 200 shown in FIG. 2. The same reference signs may be used, and duplicate description may be omitted.

According to various embodiments, the access amount determiner 302 may be configured to determine an amount of access to the pre-determined radio resource. According to various embodiments, the criterion related to an overload on the pre-determined radio resource may be evaluated using the determined amount of access to the pre-determined radio resource.

According to various embodiments, the pre-determined criterion may include or may be a criterion related to interference on the pre-determined radio resource.

According to various embodiments, the interference amount determiner 304 may be configured to determine an amount of interference on the pre-determined radio resource. According to various embodiments, the criterion related to interference on the pre-determined radio resource may be evaluated using the determined amount of interference on the pre-determined radio resource.

According to various embodiments, the at least one communication resource of the base station 300 may include or may be a connection from the radio base station 300 to a core network.

According to various embodiments, the at least one communication resource of the base station 300 may include or may be a connection from the radio base station 300 to a mobility management entity of the core network.

According to various embodiments, the at least one communication resource of the base station 300 may include or may be a connection from the radio base station 300 to a serving gateway of the core network.

According to various embodiments, the pre-determined criterion may include or may be a criterion related to a load amount on at least one of the core network and the connection from the base station 300 to the core network.

According to various embodiments, the load amount information receiver 306 may be configured to receive, from the core network, information indicating a load amount of load on at least one of the core network and the connection from the base station 300 to the core network. According to various embodiments, the criterion related to the load amount may be evaluated using the received load amount information.

According to various embodiments, the external information receiver 308 may be configured to receive, from outside a core network to which the radio base station 300 is connected, external information indicating that an overload situation is expected to occur. According to various embodiments, the pre-determined criterion may include or may be a criterion related to the external information.

According to various embodiments, the controlling information may include or may be at least one of: blocking information indicating a period of time during which no access to the pre-determined radio resource is to be made; delay information indicating an upper limit of time for randomly determining a point of time to request access to the pre-determined radio resource; and configuration information indicating a configuration of the pre-determined radio resource.

According to various embodiments, the recipient information may include or may be at least one of: list information indicating at least one recipient that is to apply the controlling information; and access class information indicating at least one group of recipients that is to apply the controlling information.

According to various embodiments, the sender 208 may further be configured to send the Random Access Response message on a downlink shared channel.

FIG. 4 shows a mobile radio terminal 400 in accordance with an embodiment. The mobile radio terminal 400 may include: a sender 402 configured to send, via a pre-determined radio resource, a Random Access Preamble to a radio base station; a receiver 404 configured to receive a Random Access Response message in response to the sent Random Access Preamble from the radio base station; a reception determiner 406 configured to determine whether the received Random Access Preamble includes controlling information for controlling access to the pre-determined radio resource and to determine whether the received Random Access Preamble includes recipient information indicating whether a recipient of the Random Access Response message is to apply the controlling information; and an access controller 408 configured to control access to the pre-determined radio resource based on the determination of the reception determiner The sender 402, receiver 404, reception determiner 406 and access controller 408 may be coupled with each other, e.g. via an electrical connection 410 such as e.g. a cable or a computer bus or via any other suitable electrical connection to exchange electrical signals.

According to various embodiments, a recipient of a message may be understood as a mobile radio terminal that may receive and decode the message.

According to various embodiments, the recipient information may indicate whether a recipient that is able to decode the Random Access Response message is to apply the controlling information.

In various embodiments, at least one of the sender 402 and the receiver 404 may be configured according to at least one radio communication technology of one of the following radio communication technology families:
a Short Range radio communication technology family;
a Metropolitan Area System radio communication technology family;
a Cellular Wide Area radio communication technology family;
a radio communication technology family which includes a radio communication technology in which the access to radio resources is provided in a random manner; and
a radio communication technology family which includes a radio communication technology in which the access to radio resources is provided in a centrally controlled manner.

In various embodiments, at least one of the sender 402 and the receiver 404 may be configured according to at least one of the following radio communication technologies: a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, and Unlicensed Mobile Access (UMA, also referred to as also referred to as 3GPP Generic Access Network, or GAN standard)).

According to various embodiments, the pre-determined radio resource may include or may be a random access channel.

According to various embodiments, the pre-determined radio resource may include an LTE RACH.

According to various embodiments, the pre-determined radio resource may include or may be a physical random access channel.

According to various embodiments, the pre-determined radio resource may include or may be an LTE PRACH.

According to various embodiments, the mobile radio terminal may include or may be at least one of a user equipment and a machine-type communications device.

According to various embodiments, the mobile radio terminal may include or may be a smart meter.

According to various embodiments, the controlling information may include or may be at least one of: blocking information indicating a period of time during which no access to the pre-determined radio resource is to be made; delay information indicating an upper limit of time for randomly determining a point of time to request access to the pre-determined radio resource; and configuration information indicating a configuration of the pre-determined radio resource.

According to various embodiments, the recipient information may include or may be at least one of: list information indicating at least one recipient that is to apply the controlling information; and access class information indicating at least one group of recipients that is to apply the controlling information.

According to various embodiments, the receiver may be configured to receive the Random Access Response message on a downlink shared channel.

FIG. 5 shows a mobile radio terminal 500 in accordance with an embodiment. The mobile radio terminal 500 may include, similar to the mobile radio terminal 400 shown in FIG. 4, a sender 402, a receiver 404, a reception determiner 406, and an access controller 408. The mobile radio terminal 500 may furthermore include a memory 502, like will be explained in more detail below, and an application determiner 504, like will be explained in more detail below. The sender 402, receiver 404, reception determiner 406, access controller 408, the memory 502, and the application determiner 504 may be coupled with each other, e.g. via an electrical connection 506 such as e.g. a cable or a computer bus or via any other suitable electrical connection to exchange electrical signals.

Various parts of the mobile radio terminal 500 may be similar to parts of the mobile radio terminal 400 shown in FIG. 4. The same reference signs may be used, and duplicate description may be omitted.

According to various embodiments, the memory 502 may be configured to store at least one of an identifier of the mobile radio terminal 500 and an identifier of a group of mobile radio terminals to which the mobile radio terminal 500 belongs.

According to various embodiments, the application determiner 504 may be configured to determine whether the mobile radio terminal 500 is to apply the controlling information based on the recipient information and on the stored at least one of an identifier of the mobile radio terminal 500 and an identifier of a group of mobile radio terminals to which the mobile radio terminal 500 belongs.

According to various embodiments, the access controller 408 may further be configured to control access to the pre-determined radio resource based on the determination of the application determiner 504.

Figure 6:
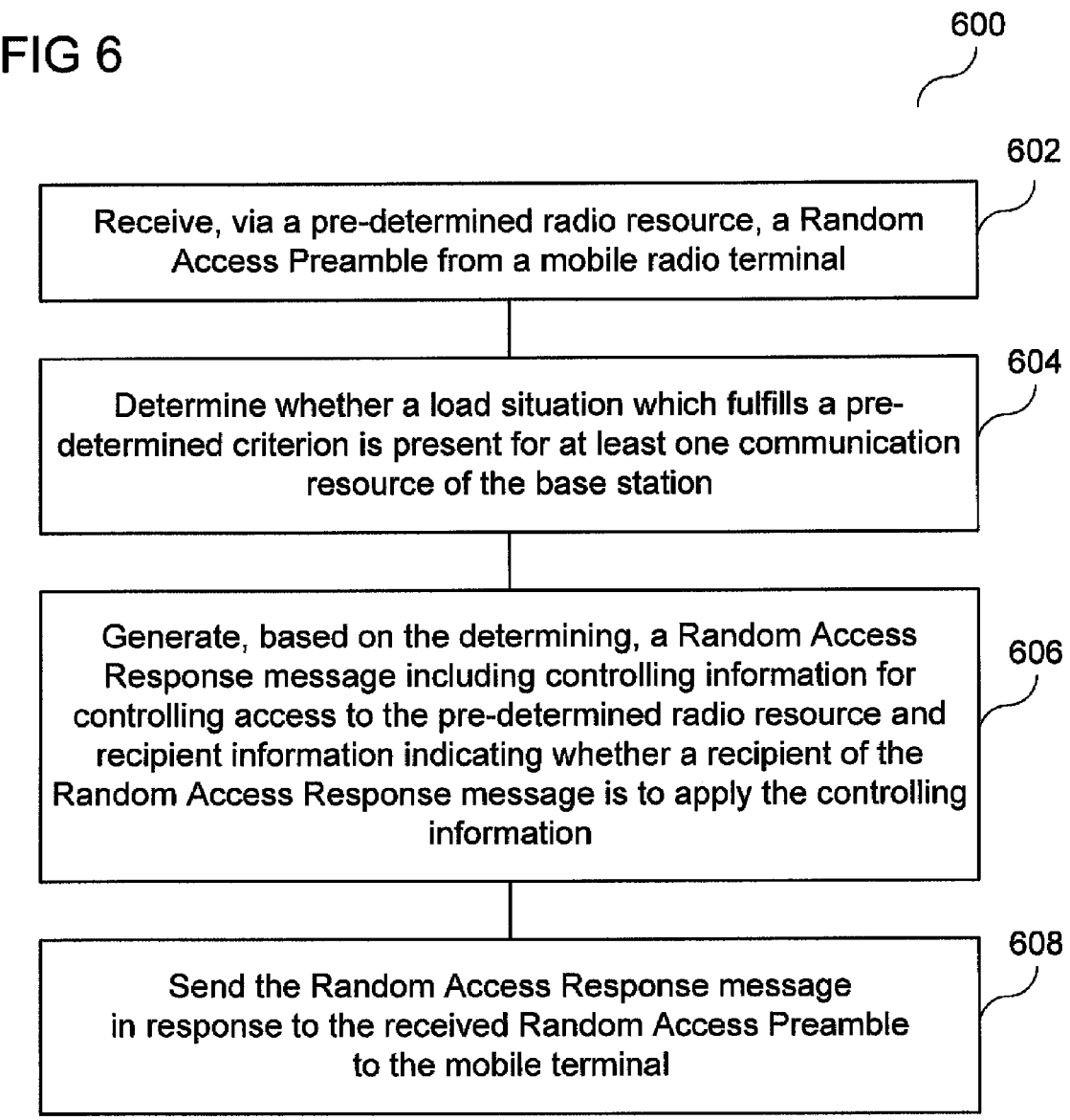
FIG. 6 shows a flow diagram illustrating a method for controlling a radio base station in accordance with an embodiment.

FIG. 6 shows a flow diagram 600 illustrating a method for controlling a radio base station in accordance with an embodiment. In 602, a Random Access Preamble may be received, via a pre-determined radio resource, from a mobile radio terminal. In 604, it may be determined whether a load situation which fulfills a pre-determined criterion is present for at least one communication resource of the base station. In 606, a Random Access Response message including controlling information for controlling access to the pre-determined radio resource and recipient information indicating whether a recipient of the Random Access Response message is to apply the controlling information may be generated, based on the determining of 604. In 608, the Random Access Response message may be sent to the mobile radio terminal in response to the received Random Access Preamble.

According to various embodiments, a recipient of a message may be understood as a mobile radio terminal that may receive and decode the message.

According to various embodiments, the recipient information may indicate whether a recipient that is able to decode the Random Access Response message is to apply the controlling information.

In various embodiments, at least one of the receiving in 602 and the sending in 608 may be performed according to at least one radio communication technology of one of the following radio communication technology families:

a Short Range radio communication technology family;

a Metropolitan Area System radio communication technology family;

a Cellular Wide Area radio communication technology family;

a radio communication technology family which includes a radio communication technology in which the access to radio resources is provided in a random manner; and a radio communication technology family which includes a radio communication technology in which the access to radio resources is provided in a centrally controlled manner.

In various embodiments, at least one of the receiving in 602 and the sending in 608 may be performed according to at least one of the following radio communication technologies: a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4

GHz), IEEE 802.11n, IEEE 802.11VHT (VHT=Very High Throughput), a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, and Unlicensed Mobile Access (UMA, also referred to as also referred to as 3GPP Generic Access Network, or GAN standard)).

According to various embodiments, the pre-determined radio resource may include or may be a random access channel.

According to various embodiments, the pre-determined radio resource may include or may be an LTE RACH.

According to various embodiments, the pre-determined radio resource may include or may be a physical random access channel.

According to various embodiments, the pre-determined radio resource may include or may be an LTE PRACH.

According to various embodiments, the mobile radio terminal may include or may be at least one of a user equipment and a machine-type communications device.

According to various embodiments, the mobile radio terminal may include or may be a smart meter.

According to various embodiments, the at least one communication resource of the base station may include or may be the pre-determined radio resource.

According to various embodiments, the pre-determined criterion may include or may be a criterion related to an overload on the pre-determined radio resource.

According to various embodiments, an amount of access to the pre-determined radio resource may be determined. According to various embodiments, the criterion related to an overload on the pre-determined radio resource may be evaluated using the determined amount of access to the pre-determined radio resource.

According to various embodiments, the pre-determined criterion may include or may be a criterion related to interference on the pre-determined radio resource.

According to various embodiments, an amount of interference on the pre-determined radio resource may be determined. According to various embodiments, the criterion related to interference on the pre-determined radio resource may be evaluated using the determined amount of interference on the pre-determined radio resource.

According to various embodiments, the at least one communication resource of the base station may include or may be a connection from the radio base station to a core network.

According to various embodiments, the at least one communication resource of the base station may include or may be a connection from the radio base station to a mobility management entity of the core network.

According to various embodiments, the at least one communication resource of the base station may include or may be a connection from the radio base station to a serving gateway of the core network.

According to various embodiments, the pre-determined criterion may include or may be a criterion related to a load amount on at least one of the core network and the connection from the base station to the core network.

According to various embodiments, information indicating a load amount of load on at least one of the core network and the connection from the base station to the core network may be received from the core network. According to various embodiments, the criterion related to the load amount may be evaluated using the received load amount information.

According to various embodiments, external information indicating that an overload situation is expected to occur may be received from outside a core network to which the radio base station is connected. According to various embodiments, the pre-determined criterion may include or may be a criterion related to the external information.

According to various embodiments, the controlling information may include or may be at least one of: blocking information indicating a period of time during which no access to the pre-determined radio resource is to be made; delay information indicating an upper limit of time for randomly determining a point of time to request access to the pre-determined radio resource; and configuration information indicating a configuration of the pre-determined radio resource.

According to various embodiments, the recipient information may include or may be at least one of: list information indicating at least one recipient that is to apply the controlling information; and access class information indicating at least one group of recipients that is to apply the controlling information.

According to various embodiments, the Random Access Response message may be sent on a downlink shared channel.

FIG. 7 shows a flow diagram 700 illustrating a method for controlling a mobile radio terminal in accordance with an embodiment. In 702, a Random Access Preamble may be sent to a radio base station via a pre-determined radio resource. In 704, a Random Access Response message may be received in response to the sent Random Access Preamble from the radio base station. In 706, it may be determined whether the received Random Access Preamble includes controlling information for controlling access to the pre-determined radio resource and whether the received Random Access Preamble includes recipient information indicating whether a recipient of the Random Access Response message is to apply the controlling information. In 708, access to the pre-determined radio resource may be controlled based on the determining.

According to various embodiments, a recipient of a message may be understood as a mobile radio terminal that may receive and decode the message.

According to various embodiments, the recipient information may indicate whether a recipient that is able to decode the Random Access Response message is to apply the controlling information.

In various embodiments, at least one of the sending 702 and the receiving 704 may be performed according to at least one radio communication technology of one of the following radio communication technology families:

a Short Range radio communication technology family;

a Metropolitan Area System radio communication technology family;

a Cellular Wide Area radio communication technology family;

a radio communication technology family which includes a radio communication technology in which the access to radio resources is provided in a random manner; and a radio communication technology family which includes a radio communication technology in which the access to radio resources is provided in a centrally controlled manner.

In various embodiments, at least one of the sending 702 and the receiving 704 may be performed according to at least one of the following radio communication technologies: a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, and Unlicensed Mobile Access (UMA, also referred to as also referred to as 3GPP Generic Access Network, or GAN standard)).

According to various embodiments, the pre-determined radio resource may include or may be a random access channel.

According to various embodiments, the pre-determined radio resource may include an LTE RACH.

According to various embodiments, the pre-determined radio resource may include or may be a physical random access channel.

According to various embodiments, the pre-determined radio resource may include or may be an LTE PRACH.

According to various embodiments, the mobile radio terminal may include or may be at least one of a user equipment and a machine-type communications device.

According to various embodiments, the mobile radio terminal may include or may be a smart meter.

According to various embodiments, the controlling information may include or may be at least one of: blocking information indicating a period of time during which no access to the pre-determined radio resource is to be made; delay information indicating an upper limit of time for randomly determining a point of time to request access to the pre-determined radio resource; and configuration information indicating a configuration of the pre-determined radio resource.

According to various embodiments, the recipient information may include or may be at least one of: list information indicating at least one recipient that is to apply the controlling information; and access class information indicating at least one group of recipients that is to apply the controlling information.

According to various embodiments, the receiver may be configured to receive the Random Access Response message on a downlink shared channel.

According to various embodiments, at least one of an identifier of the mobile radio terminal and an identifier of a group of mobile radio terminals to which the mobile radio terminal belongs may be stored.

According to various embodiments, it may be determined whether the mobile radio terminal is to apply the controlling information based on the recipient information and on the stored at least one of an identifier of the mobile radio terminal and an identifier of a group of mobile radio terminals to which the mobile radio terminal belongs. According to various embodiments, access to the pre-determined radio resource may be controlled based on the determination.

According to various embodiments, a computer program product may be provided that may carry out one or more of the methods described above, when executed on a computer.

FIG. 8 shows a radio base station 800 in accordance with an embodiment. The radio base station 800 may include a transmitter 802 configured to, upon receipt of a Random Access Preamble from a mobile radio terminal via a pre-determined radio resource, transmit a Random Access Response message including information for controlling access to the pre-determined radio resource and indicating which mobile radio terminals should apply the information for controlling, to the mobile radio terminal, based on a load situation at the radio base station.

According to various embodiments, a mobile radio terminal (not shown) may be provided. The mobile radio terminal may include a determiner configured to, upon receipt of a Random Access Response message from a radio base station in response to a Random Access Preamble sent to the radio base station via a pre-determined radio resource, determine whether to apply information for controlling access to the pre-determined radio resource included in the Random Access Response message based on information indicating which mobile radio terminals should apply the information for controlling included in the Random Access Response message.

According to various embodiments, a method for controlling a radio base station may be provided. The method may include transmitting, upon receipt of a Random Access Preamble from a mobile radio terminal via a pre-determined radio resource, a Random Access Response message including information for controlling access to the pre-determined radio resource and indicating which mobile radio terminals should apply the information for controlling, to the mobile radio terminal, based on a load situation at the radio base station.

According to various embodiments, a method for controlling a mobile radio terminal may be provided. The method may include determining, upon receipt of a Random Access Response message from a radio base station in response to a Random Access Preamble sent to the radio base station via a pre-determined radio resource, whether to apply information for controlling access to the pre-determined radio resource included in the Random Access Response message based on information indicating which mobile radio terminals should apply the information for controlling included in the Random Access Response message.

According to various embodiments, devices and methods may be provided for overload control for random access.

According to various embodiments, for example in LTE, two types of random access procedure may be specified: contention-based and non-contention based random access procedure. The contention-based random access may be performed by an LTE UE for example in the following 6 cases:

1. An idle UE wants to access the network (initial access from RRC_IDLE);

2. A connected UE has lost the connection and wants to re-connect (connection re-establishment);

3. A connected UE is instructed by the network to handover to another cell;

4. The UE is connected and downlink data for the UE arrives at the core network, but the uplink of this UE is currently not synchronized (DL data arrival during RRC_CONNECTED requiring RA procedure);

5. The UE is connected and wants to transmit data in uplink, but the uplink of this UE is currently not synchronized (UL (uplink) data arrival during RRC_CONNECTED requiring RA (Random Access) procedure); and 6. For positioning purpose during RRC_CONNECTED requiring random access procedure, for example when timing advance is needed for UE positioning.

Figure 9:
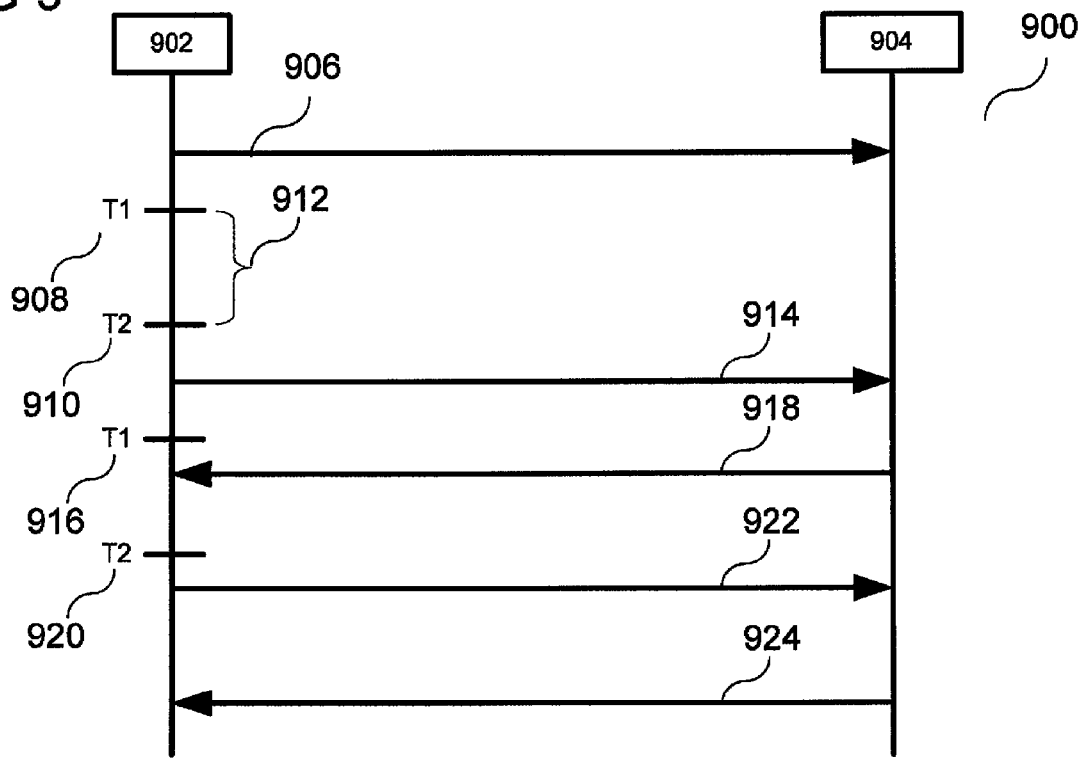
FIG. 9 shows a flow diagram illustrating a method in accordance with an embodiment.

FIG. 9 shows a flow diagram 900 illustrating a method in accordance with an embodiment. A flow of data may be shown between a mobile radio terminal 902 (for example a UE) and a radio base station 904 (for example an eNB). Time may be shown to proceed from top to bottom of the flow diagram 900.

According to various embodiments, the contention-based random access procedure (for example contention-based RACH procedure) as specified for LTE in Release 8 like illustrated in FIG. 9 may for example include the following messages:

First message 906 (which may also be referred to as message 1): A Random Access Preamble (RAP), may be transmitted by the UE on a pre-determined radio resource, for example on the "Random Access Channel" (RACH).

Second message 918 (which may also be referred to as message 2): A Random Access Response (RAR) generated by MAC-Layer of the receiving eNB, may be transmitted, for example on the DL-SCH. If this message is not received by the UE 902 during a certain period after transmission of the first message 906 (message 1), for example between a first point of time T1 (908) and a second point in time T2 (910), the UE may re-transmit the first message 906 (message 1; which in a re-transmission is shown as message 914) with increased power until the second message 918 (message 2) is received or the maximum number of re-transmissions is reached.

Third message 922 (which may also be referred to as message 3): Scheduled transmission, for example first scheduled UL (uplink) transmission on UL-SCH (uplink shared channel).

Fourth message 924 (which may also be referred to as message 4): Contention Resolution, for example on DL-SCH (downlink shared channel).

After a re-transmission of the Random Access Preamble, the mobile radio terminal 902 may expect the receipt of a Random Access Response message between the time T1 (916) and the time T2 (920).

The reception window 912 between the first point of time T1 (908) and the second point of time T2 (910) may be considered as the reception window for the second message 918 (message 2), in other words, the mobile radio terminal 902 may re-transmit the first message 906 (message 1) as a re-transmitted first message 914 with increased power if the second message 918 (message 2) is not received within this reception window 912.

The Random Access Response (RAR) message 918 (message 2) may be transmitted by the eNB semi-synchronous with message 1, i.e. within a flexible window of one or more TTIs (Transmission Time Intervals) after transmission of message 1.

The Random Access Response (RAR) message 918 (message 2) may be transmitted on the DL-SCH transport channel and its presence may be signaled on PDCCH containing the "Random Access-Radio Network Temporary Identifier" (RA-RNTI). This may be used to address all UEs of the cell that have transmitted a Random Access Preamble within the flexible window prior to the reception of the Random Access Response.

The Random Access Response (RAR) message 918 (message 2) may be intended for one or multiple UEs in one DL-SCH message.

The Random Access Response (RAR) message 918 (message 2) may carry the following Information Elements:
   Random Access Preamble Identifier (RAP-ID, 6 bits). This may indicate the UE that its preamble was received correctly by the eNB.
   Timing Advance Command (11 bits). This value may be used by the UE to transmit its Uplink transmission earlier, which should result in synchronous reception at the eNB.
   Initial UL grant information (20 bits). This may assign an Uplink resource of the PUSCH to the relating UE used to transmit the third message 922 (message 3).
   Temporary cell-RNTI (C-RNTI) (16 bits). This may be used to address the UE in the following transmissions.

The Random Access Response (RAR) message 918 (message 2) may further include a "backoff indicator". This may be used to delay the next random access attempt in case of overload. The delay may be between 0 and 960 ms.

The first message 906 (message 1) may be transmitted by the UE 902 within configured time slots that are allowed for RACH. These time slots may be called RACH occasions. Beside the RACH occasions, the length of the preambles (Preamble format) may be configurable by the eNB. Both values may be configured by the "PRACH Configuration Index" which may be broadcasted by the eNB 904. It may be possible to configure the number of RACH occasions from 1 RACH occasion in 20 ms (e.g. configuration ID 0) to 20 RACH occasions in 20 ms (configuration ID 14).

According to various embodiments, if the UE 902 wants to use the random access procedure, it may select randomly a random access preamble from the set of configured preambles and may transmit the preamble in the next available RACH occasion.

In case that the UE doesn't receive the second message 918 (message 2) within the flexible window 912 after transmission of the first message 906 (message 1), it may re-send the first message (message 1; referred to as re-transmitted first message 914) with increased power. If several retries failed, the UE 902 may stop random access and may retry it at a later point in time. This situation may for example occur when many UEs try to use the RACH and therefore two or more UEs simultaneously use the same RACH resource, and for example transmit the same preamble at the same RACH occasion. In this case, the eNB 904 may fail to receive the Random Access Preamble 906 correctly and may not transmit the Random Access Response 918.

The need to introduce new mechanisms related to RAN overload control for MTC devices is currently discussed in 3GPP as a very large number of MTC devices is expected to be in a cell (>1000 per sector) that will cause RACH overload. To avoid RACH overload due to the presence of MTC devices, following solutions may be proposed:
   MTC-device specific access class barring scheme signaled in "System Information Block Type 2" (SIB2). This method may prevent MTC devices of the relating access class from using the RACH. Therefore "non-MTC devices", for example normal LTE UEs, may not be affected by RACH overload caused by MTC devices. This method may not solve the overload situation. It may occur again if the barring is released. Further it may not allow MTC device-specific access control. The MTC-device specific access class barring may shift the overload to another time, where it may occur again.
   Randomization of RACH access e.g. by introducing MTC-device specific large backoff values. This method may reduce the overload by spreading the accesses in time. On the other hand, it may increase the access delay every time an MTC-device wants to perform random access and may therefore not be applicable for time intolerant applications. Randomization of RACH access may increase the access delay every time an MTC-device wants to perform random access and is therefore may not be applicable for time intolerant applications.
   Allocating MTC-device specific RACH resources (e.g. by assigning own preambles and/or time slots reserved for RACH (for example RACH occasions)). With these separate resources, an MTC-device caused overload may not affect "non-MTC devices". On the other hand, it may limit the RACH resources permanently for both the MTC- and non-MTC devices even when the reserved resources are unused.
   Resource consumption optimization based on subscription profile (e.g. by MTC subscriber specific setting of inactivity timer and QoS). This method may be used to optimize the number of accesses usually performed by MTC devices. But this method may not be applicable if the access is not predictable.

As outlined above, each proposed solution has its merits and drawbacks, so that there is potential for further optimizations. According to various embodiments, a further solution is provided by extending the RAR message 2 related to the current contention-based RACH procedure for MTC devices.

According to various embodiments, devices and methods may be provided for avoiding RACH overload by providing RACH overload control.

According to various embodiment, a radio base station, for example an eNB, may be detecting overload on a pre-determined radio resource, for example RACH overload, e.g. by counting the number of RACH accesses (for example reception of Random Access Preambles) during a time interval in relation to the number of available RACH resources or by measuring the interference level within the RACH occasions. According to various embodiments, the radio base station may further detect network congestion on the interface eNB-MME or may be informed about the congestion by a message transmitted from the relating MME.

According to various embodiments, the radio base station, for example the eNB, may detect the RACH overload and may obtain information about the overload reason (for example power disruption, traffic jam, . . . ).

According to various embodiments, the radio base station, for example the eNB, may control the overload by transmission of a Random Access Response message, that includes controlling information for controlling access to the pre-determined radio resource, for example one or more of the following "RACH overload control commands":

A) NACK indication: With this indication, the radio base station may signal to all mobile radio terminals, for example all UEs, in the cell, that perform a random access (for example non-MTC devices, i.e. normal UEs, and MTC devices as well), that the RACH access is blocked for a definite time for all UEs or certain type of UEs.

B) RACH overload indication: With this indication, the radio base station may signal to all mobile radio terminals in the cell, that perform a random access, that some or all devices (in other words: some or all mobile radio terminals) shall apply RACH access time randomization, for example to delay their re-attempt over an additional random period.

C) RACH resource re-configuration: With this command, the radio base station may temporarily re-configure RACH resources for some or all mobile radio terminals, e.g. offering more resources to MTC devices and reducing the resources to non-MTC devices and vice versa.

According to various embodiments, a RACH access method may be provided that may be adapted dynamically and immediately to the occurrence of a RACH overload and specific to the causing UEs or causing UE classes. This may increase the number of successful random accesses and may enable a method for prioritization of random access depending on the device class (non-MTC device, MTC device). Furthermore, the addressing method for the "RACH overload control commands" may allow to control specific devices, specific device classes or all UEs that currently attempt a random access.

According to various embodiments, a radio base station, for example an eNB, may detect an overload on a pre-determined communication resource of the radio base station, for example a RACH overload, and may control the overload by transmission of a Random Access Response message, which may solve the overload by blocking certain or all mobile radio terminals, by spreading the random accesses of certain or all mobile radio terminals in time or by re-configuring resources, for example random access resources, for certain or all mobile radio terminals.

According to various embodiments, a radio cell configured of an LTE radio cell based on OFDMA (Orthogonal Frequency Division Multiple Access)/TDMA (Time Division Multiple Access) in downlink, SC-FDMA (Single Carrier Frequency Division Multiple Access)/TDMA in uplink, and operating in FDD (Frequency Division Duplex) mode may be provided.

According to various embodiments, the Random Access response message may include one or more the following 3 "RACH overload control commands" with a related "recipients"-field and "parameters"-field:

TABLE 1

Parameter settings of RACH overload control commands

| RACH overload control command (for example 2 Bits) | Recipients (Variable number of Bits) | Parameters (for example 6 Bits) |
| --- | --- | --- |
| NACK indication | Number of listed RAP-IDs (for example 6 Bits), List of RAP-IDs (for example 6 Bits per ID), Number of listed Access Classes (for example 4 Bits), List of Access Classes (for example 4 Bits per Access Class) | blocking duration (for example 6 Bits, for example corresponding to durations from 1 s to 8 h): During the indicated duration, the addressed devices may be prohibited to use the RACH |
| RACH overload indication | Number of listed RAP-IDs (for example 6 Bits), List of RAP-IDs (for example 6 Bits per ID), Number of listed Access Classes (for example 4 Bits), List of Access Classes (for example 4 Bits per Access Class) | Additional random delay (for example 6 Bits, for example corresponding to delays from 10 ms to 8 min): The addressed devices may be required to wait a random period between 0 and the indicated value before initiating the next random access |
| RACH resource re-configuration | Number of listed RAP-IDs (for example 6 Bits), List of RAP-IDs (for example 6 Bits per ID), Number of listed Access Classes (for example 4 Bits), List of Access Classes (for example 4 Bits per Access Class) | PRACH configuration ID (for example 6 Bits): May define the new configuration to be applied by the addressed devices. The coding is the same as in commonly used signaling. |

According to various embodiments, the "RACH overload control command" field may indicate, which command is to be applied by the UEs addressed by the "recipients"-field.

According to various embodiments, the "Recipient" field may indicate which devices have to apply the command. According to various embodiments, the devices may be addressed by a RAP-ID, for example a device that has recently transmitted the indicated RAP, may have to apply the command. If the Number of listed RAP-IDs is indicated as "0", all devices that have used any possible RAP-ID (for example configured by the eNB) in the recently send RAP message may have to apply the command. The devices that have to apply the command may be further limited by inclusion of Access Classes (ACs) in the "recipient"-field. Only the devices that are part of one of the indicated ACs may have to apply the command. If the number of listed ACs is "0", devices of all Access Classes may have to apply the command.

According to various embodiments, the number of entries in the recipient field may be variable. According to various embodiments, therefore, the number of listed RAP-IDs and the number of listed Access Classes may be included in this field to make the UE aware of it so that the UE could decode this field correctly.

According to various embodiments, the "Parameters" field may include a parameter related to the type of "RACH overload control command" (for details see for example Table 1).

According to various embodiments, it may be assumed that 1, 2 or 3 different RACH overload control commands may be included in one RAR message.

According to various embodiments, the different "RACH overload control commands" may be used by the eNB for example under following conditions:
  NACK indication: It may be used in case the eNB could not handle any random access because the interface eNB-MME is congested or because the eNB or MME itself are not able to perform relating operations because the hardware is overloaded.
  RACH overload indication: It may be used in case the air interface for the RACH is overloaded.
  RACH resource re-configuration: It may be used in case the RACH is overloaded and the "RACH overload indication" does not solve the overload. The UE may assign more resources to certain UEs, e.g. to all MTC devices, or to all UEs. This may be useful when the reason for the overload is known by the eNB. For example, after power disruption, the eNB may assign more RACH resources to MTC-devices, or in case of traffic jam the eNB may assign more resources to car mounted devices. The eNB may therefore be enabled to obtain information about RACH overload causing events and may use this information accordingly.

According to various embodiments, a NACK indication may indicate to block RACH access temporarily for certain UEs, a RACH overload indication may indicate to spread RACH access in time for certain UEs, and a RACH resource re-configuration may indicate to offer more or less RACH resources for certain devices.

According to various embodiments, the radio base station, for example the eNB, may transmit the selected commands to all UEs, to certain UEs or to a certain device class that causes the overload, for example by using a "random access response" message.

According to various embodiments, the UEs may apply the indicated instructions.

According to various embodiments, the eNB may select a control command specific for the current overload situation and specific for the overload causing devices. Therefore, according to various embodiments, RACH resources may only be reserved if they are needed, and no RACH resources are wasted.

According to various embodiments, the control command may be signaled immediately after the overload occurred. According to various embodiments, there may be no delay to solve the issue.

According to various embodiments, the control command may be sent to the causing devices only and to certain device classes. This may enable the priorization of certain devices against other devices. For example, it may be possible to keep the overload from human operated devices by temporarily redirecting MTC-devices to separate RACH resources.

According to various embodiments, a method may allow to control specific devices, specific device classes or all UE that currently attempt a random access.

According to various embodiments, devices and methods may be provided for increasing the number of successful random accesses.

According to various embodiments, methods and devices for overload control for random access may be provided for control of situations in which MTC-Devices (for example smart meters) may cause RACH overload after power disruption.

Figure 10:
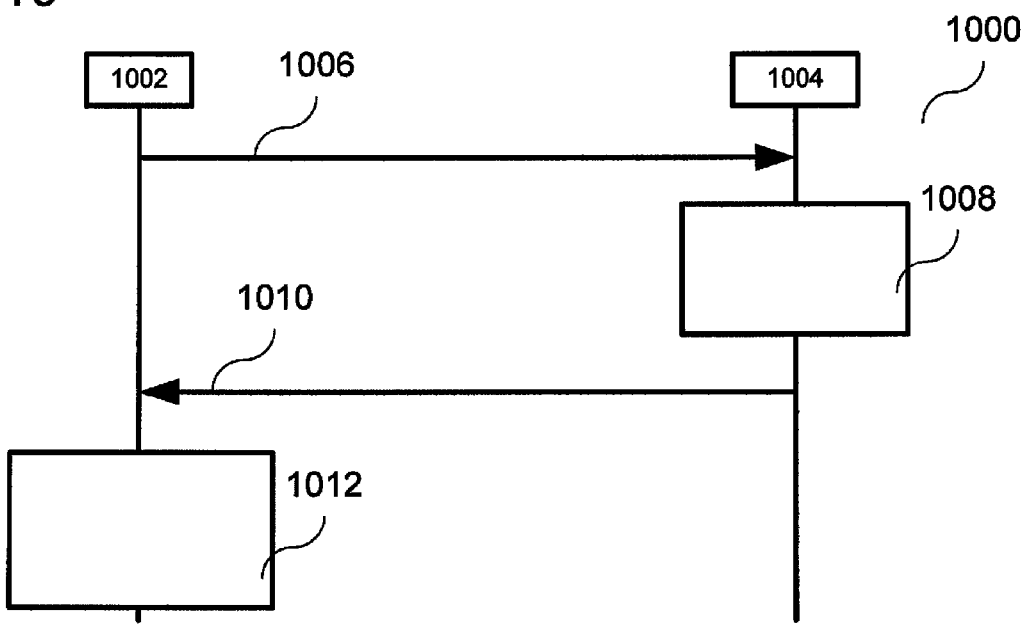
FIG. 10 shows a flow diagram illustrating a method in accordance with an embodiment.

FIG. 10 shows a flow diagram 1000 illustrating a method in accordance with an embodiment. The flow diagram 1000 may illustrate a contention-based RACH procedure in case of RACH overload. Time may be shown to proceed from top to bottom of the flow diagram 1000.

According to various embodiments, it may be assumed that many smart meters are configured to report a power failure to the MTC Server and that all such smart meters belong to the same access class (AC), which may be different from any access class used for human operated UEs. For example, currently a serving radio base station 1004, for example a serving eNB, may be assumed to be configured to handle a small amount of random access attempts, for example subframe number 7 of every even numbered system frame may be allowed for RACH, which for example may correspond to PRACH configuration #2 for LTE-FDD.

For example, it may further be assumed that a power failure occurs and the meters start a random access to report the failure to the MTC-Server. For example, due to the high number of accesses, the RACH may be overloaded. For example, no preamble may be received correctly by the eNB 1004, but instead strong interferences may be detected on RACH resources by the eNB 1004. For example, therefore the eNB 1004 may detect the overload (like indicated by block 1008), and it may also receive an indication from another network entity that a power disruption occurred within the coverage area of the eNB 1004. According to various embodiments, therefore, the eNB 1004 may decide to transmit a Random Access Response message 1010 (which may be referred to as message 2), including a RACH overload control command, for example a RACH resource re-configuration command, to all mobile radio terminals, for example all UEs, currently trying a random access, for example to a UE 1002 having transmitted a Random Access Preamble 1006 (which may be referred to as message 1). According to various embodiments, the UE 1002 may apply the received instructions, like indicated by block 1012. According to various embodiments, the re-configuration may increase the RACH resources exclusive for the smart meters, for example PRACH configuration #10 and AC#11 may be signaled. According to various embodiments, furthermore, the new configuration may reserve RACH resources (i.e. RACH occasions) for smart meters that are not shared with other devices. According to various embodiments, all other devices that are not belonging to AC#11 may ignore this message. According to various embodiments, the other devices that are not belonging to AC#11 may use the previous RACH configuration.

According to various embodiments, the eNB 1004 may transmit the same message as long as overload occurs on common RACH resources, for example resources belonging to RACH configuration #2. According to various embodiments, in case that overload also occurs within the new RACH resources, the eNB 1004 may decide to re-configure the RACH resources for the smart meters again to provide more RACH resources or to use the "RACH overload indication".

According to various embodiments, this signaling may redirect smart meters to new RACH resources which may prevent the other UEs from being affected by the RACH overload and may ensure fast execution of a large number of random access attempts.

According to various embodiments, a radio base station, for example an eNB, may detect network overload.

For example, it may be assumed, that a network overload was detected by the eNB in an embodiment. For example, therefore, no Random Access attempt may be accepted by the eNB.

According to various embodiments, if the radio base station, for example the eNB, receives one or more Random Access Preambles during this network overload, it may transmit a NACK by using the Random Access Response message described above to all UEs currently attempting a random access. According to various embodiments, the eNB may set the value for RACH blocking duration to "10 minutes".

According to various embodiments, all UEs receiving this NACK may re-attempt their RACH access again in 10 minutes.

According to various embodiments, the eNB may transmit the NACK message as response to every received Random Access preamble until the network overload ends. According to various embodiments, after the overload ends, the eNB may respond as usual, for example with a Random Access Response that will lead to transmission of message 3 and message 4 shown in FIG. 9. According to various embodiments, the eNB may use the "RACH overload indication" to spread the accesses when RACH overload at the re-attempts occurs or may re-configure the RACH prior to the re-attempts.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio base station, comprising:
a receiver configured to receive, via a pre-determined radio resource, a Random Access Preamble from a mobile radio terminal;
a load determiner configured to determine whether a load situation which fulfills a pre-determined criterion is present for at least one communication resource of the radio base station;
a Random Access Response message generator configured to generate, based on the determination of the load determiner, a Random Access Response message including a single controlling information for controlling access to the pre-determined radio resource and recipient information corresponding to at least two recipients of the Random Access Response message to apply the controlling information; and
a sender configured to send the Random Access Response message in response to the received Random Access Preamble to the mobile radio terminal.

2. The radio base station of claim 1,
wherein the at least one communication resource of the radio base station comprises the pre-determined radio resource.

3. The radio base station of claim 2,
wherein the pre-determined criterion comprises a criterion related to an overload on the pre-determined radio resource.

4. The radio base station of claim 3, further comprising:
an access amount determiner configured to determine an amount of access to the pre-determined radio resource;
wherein the pre-determined criterion related to an overload on the pre-determined radio resource is evaluated using the determined amount of access to the pre-determined radio resource.

5. The radio base station of claim 2,
wherein the pre-determined criterion comprises a criterion related to interference on the pre-determined radio resource.

6. The radio base station of claim 5, further comprising:
an interference amount determiner configured to determine an amount of interference on the pre-determined radio resource;
wherein the pre-determined criterion related to interference on the pre-determined radio resource is evaluated using the determined amount of interference on the pre-determined radio resource.

7. The radio base station of claim 1,
wherein the at least one communication resource of the radio base station comprises a connection from the radio base station to a core network.

8. The radio base station of claim 7,
wherein the pre-determined criterion comprises a criterion related to a load amount on at least one of the core network and the connection from the radio base station to the core network.

9. The radio base station of claim 8, further comprising:
a load amount information receiver configured to receive, from the core network, information indicating a load amount of load on at least one of the core network and the connection from the radio base station to the core network;
wherein the pre-determined criterion related to the load amount is evaluated using the received load amount information.

10. The radio base station of claim 1, further comprising:
an external information receiver configured to receive, from outside a core network to which the radio base station is connected, external information indicating that an overload situation is expected to occur;
wherein the pre-determined criterion comprises a criterion related to the external information.

11. The radio base station of claim 1,
wherein the controlling information comprises at least one of:
blocking information indicating a period of time during which no access to the pre-determined radio resource is to be made;
delay information indicating an upper limit of time for randomly determining a point of time to request access to the pre-determined radio resource; and
configuration information indicating a configuration of the pre-determined radio resource.

12. The radio base station of claim 1,
wherein the recipient information comprises at least one of:
list information corresponding to at least two recipients that are to apply the controlling information; and
access class information indicating at least one group of recipients that is to apply the controlling information.

13. A mobile radio terminal, comprising:
- a sender configured to send, via a pre-determined radio resource, a Random Access Preamble to a radio base station;
- a receiver configured to receive a Random Access Response message in response to the sent Random Access Preamble from the radio base station, wherein the Random Access Response message includes a single controlling information for controlling access to the pre-determined radio resource and recipient information corresponding to at least two recipients of the Random Access Response message to apply the controlling information;
- a reception determiner configured to determine whether the mobile radio terminal is one of said corresponding recipients; and
- an access controller configured to control access to the pre-determined radio resource based on the determination of the reception determiner.

14. The mobile radio terminal of claim 13,
wherein the controlling information comprises at least one of:
- blocking information indicating a period of time during which no access to the pre-determined radio resource is to be made;
- delay information indicating an upper limit of time for randomly determining a point of time to request access to the pre-determined radio resource; and
- configuration information indicating a configuration of the pre-determined radio resource.

15. The mobile radio terminal of claim 13,
wherein the recipient information comprises at least one of:
- list information corresponding to at least two recipients that are to apply the controlling information; and
- access class information indicating at least one group of recipients that is to apply the controlling information.

16. The mobile radio terminal of claim 13, further comprising:
- a memory configured to store at least one of an identifier of the mobile radio terminal and an identifier of a group of mobile radio terminals to which the mobile radio terminal belongs.

17. The mobile radio terminal of claim 16, further comprising:
- an application determiner configured to determine whether the mobile radio terminal is to apply the controlling information based on the recipient information and on the stored at least one of an identifier of the mobile radio terminal and an identifier of a group of mobile radio terminals to which the mobile radio terminal belongs.

18. The mobile radio terminal of claim 17,
wherein the access controller is further configured to control access to the pre-determined radio resource based on the determination of the application determiner.

19. A method for controlling a radio base station, the method comprising:
- receiving, via a pre-determined radio resource, a Random Access Preamble from a mobile radio terminal;
- determining whether a load situation which fulfills a pre-determined criterion is present for at least one communication resource of the radio base station;
- generating, based on the determining, a Random Access Response message including a single controlling information for controlling access to the pre-determined radio resource and recipient information corresponding to at least two recipients of the Random Access Response message to apply the controlling information; and
- sending the Random Access Response message in response to the received Random Access Preamble to the mobile radio terminal.

20. The method of claim 19,
wherein the controlling information comprises at least one of:
- blocking information indicating a period of time during which no access to the pre-determined radio resource is to be made;
- delay information indicating an upper limit of time for randomly determining a point of time to request access to the pre-determined radio resource; and
- configuration information indicating a configuration of the pre-determined radio resource.

21. The method of claim 19,
wherein the recipient information comprises at least one of:
- list information corresponding to at least two recipients that are to apply the controlling information; and
- access class information indicating at least one group of recipients that is to apply the controlling information.

22. A method for controlling a mobile radio terminal, the method comprising:
- sending, via a pre-determined radio resource, a Random Access Preamble to a radio base station;
- receiving a Random Access Response message in response to the sent Random Access Preamble from the radio base station, wherein the Random Access Response message includes a single controlling information for controlling access to the pre-determined radio resource and recipient information corresponding to at least two recipients of the Random Access Response message to apply the controlling information;
- determining whether the mobile radio terminal is one of said corresponding recipients; and
- controlling access to the pre-determined radio resource based on the determining.

23. The method of claim 22,
wherein the controlling information comprises at least one of:
- blocking information indicating a period of time during which no access to the pre-determined radio resource is to be made;
- delay information indicating an upper limit of time for randomly determining a point of time to request access to the pre-determined radio resource; and
- configuration information indicating a configuration of the pre-determined radio resource.

24. The method of claim 22,
wherein the recipient information comprises at least one of:
- list information corresponding to at least two recipients that are to apply the controlling information; and
- access class information indicating at least one group of recipients that is to apply the controlling information.

25. A radio base station, comprising:
- a transmitter configured to, upon receipt of a Random Access Preamble from a mobile radio terminal via a pre-determined radio resource, transmit a Random Access Response message including a single information for controlling access to the pre-determined radio resource and corresponding to at least two mobile radio terminals which should apply the information for controlling, to the mobile radio terminal, based on a load situation at the radio base station.

* * * * *